(12) United States Patent
Ghinamo et al.

(10) Patent No.: US 11,852,741 B2
(45) Date of Patent: Dec. 26, 2023

(54) POSITIONING METHOD AND SYSTEM FOR WIRELESS COMMUNICATION NETWORKS

(71) Applicant: TELECOM ITALIA S.p.A., Milan (IT)

(72) Inventors: Giorgio Ghinamo, Turin (IT); Massimiliano Petra, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 846 days.

(21) Appl. No.: 15/514,932

(22) PCT Filed: Sep. 29, 2014

(86) PCT No.: PCT/EP2014/070745
§ 371 (c)(1),
(2) Date: Mar. 28, 2017

(87) PCT Pub. No.: WO2016/050258
PCT Pub. Date: Apr. 7, 2016

(65) Prior Publication Data
US 2017/0219681 A1    Aug. 3, 2017

(51) Int. Cl.
*G01S 5/02* (2010.01)
*G01S 19/42* (2010.01)
*H04W 64/00* (2009.01)

(52) U.S. Cl.
CPC ........ *G01S 5/02521* (2020.05); *G01S 5/0278* (2013.01); *G01S 19/42* (2013.01); *H04W 64/00* (2013.01)

(58) Field of Classification Search
None
See application file for complete search history.

(56) References Cited

U.S. PATENT DOCUMENTS 6,034,635 A * 3/2000 Gilhousen ............. H04W 64/00
342/457
2003/0098811 A1    5/2003    Nikolai et al.
(Continued)

FOREIGN PATENT DOCUMENTS

JP          62173835 A  *  7/1987
KR     10-2011-0083542       7/2011
WO     WO 2008/042641 A2    4/2008

OTHER PUBLICATIONS

Yamamoto _IEEE_pub. date 2001.pdf (Year: 2001).*
(Continued)

*Primary Examiner* — Jinsong Hu
*Assistant Examiner* — Alexander J Yi
(74) *Attorney, Agent, or Firm* — Oblon, McClelland, Maier & Neustadt, L.L.P.

(57) ABSTRACT

A method of identifying a position of a user equipment within a wireless communication network includes: a) providing expected radio signal strengths produced by at least one radio communication station on each of plural elementary area elements in which a geographic area is subdivided; b) defining an initial attenuation experienced by the radio signals to the user equipment whose position is to be identified; c) obtaining measured radio signal strength measurements of the radio signals provided to the user equipment whose position is to be identified; d) determining an estimated elementary area element corresponding to the position of the user equipment whose position is to be identified based on the expected radio signal strengths, the initial attenuation and the radio signal strength measurements, and e) computing a final attenuation based on the estimated elementary area element. The operations b)-e) are iterated at least twice.

18 Claims, 6 Drawing Sheets

(56) References Cited

U.S. PATENT DOCUMENTS

| | | | |
|---|---|---|---|
| 2005/0059406 A1* | 3/2005 | Thomson | H04W 16/00 455/446 |
| 2008/0037689 A1* | 2/2008 | Kurt | H03G 3/3089 375/340 |
| 2008/0084858 A1 | 4/2008 | Hart et al. | |
| 2008/0096566 A1* | 4/2008 | Brunner | C07D 491/04 455/437 |
| 2009/0243914 A1* | 10/2009 | Song | G01S 19/23 342/169 |
| 2011/0263277 A1* | 10/2011 | Zuniga Gallegos | H04W 16/20 455/466 |
| 2012/0277816 A1* | 11/2012 | Zhang | A61B 5/0245 607/17 |
| 2013/0344886 A1* | 12/2013 | Jarvis | G01S 5/02 455/456.1 |
| 2014/0171118 A1 | 6/2014 | Marti et al. | |
| 2016/0005417 A1* | 1/2016 | Van Hoesel | H04R 3/005 381/317 |

OTHER PUBLICATIONS

Zhu_PHD Thesis_GIT_August2006.pdf (Year: 2006).*
International Search Report dated Jul. 22, 2015 in PCT/EP2014/070745 filed Sep. 29, 2014.
Written Opinion dated Jul. 22, 2015 in PCT/EP2014/070745 filed Sep. 29, 2014.
Paul D Groves, et al., "Intelligent Urban Positioning using Multi-Constellation GNSS with 3D Mapping and NLOS Signal Detection" $25^{th}$ International Technical Meeting of the Satellite Division of The Institute of Navigation, Sep. 2012, pp. 458-472.
D. Zimmermann, et al., "Database Correlation for Positioning of Mobile Terminals in Cellular Networks using Wave Propagation Models" Vehicular Technology Conference, 2004, 5 Pages.
Jian Zhu, "Indoor/Outdoor Location of Cellular Handsets Based on Received Signal Strength" School of Electrical and Computer Engineering Georgia Institute of Technology PhD thesis, Aug. 2006, 140 Pages.
Office Action dated Nov. 30, 2020 in Korean Application No. 10-2017-7011227, with an English translation, (21 pgs).

* cited by examiner

POSITIONING METHOD AND SYSTEM FOR WIRELESS COMMUNICATION NETWORKS

BACKGROUND OF THE INVENTION

Field of the Invention

The present invention refers to communication systems. More particularly, the present invention relates to the field of wireless or mobile telecommunication networks. Even more particularly, the present invention relates to a positioning method and system for identifying a position of mobile communication devices (e.g., mobile telephones, smart-phones and tablets)—generally referred to as User Equipment, or UE in brief—in a wireless communication network.

Overview of the Related Art

In the art, a common approach for estimating UE position within an area covered by the wireless communication network is based on a matching between Radio Frequency (RF) signals strength maps (e.g., a database comprising expected RF signal strengths each associated with a respective portion or pixel of a geographic area of interest—coverage area—of the wireless communication network) and the signal strength measurements that are generally performed by UE to be located during their operation. This positioning technology is often referred to as "RF fingerprint positioning", because the expected RF signal strengths in an area of interest are also referred to as "RF fingerprints".

For example in the case the wireless communication network is a mobile telephony network, RF signal strength measurements are periodically sent by UE to the wireless communication network for call management by the wireless communication network. Such RF signal strength measurements may be used for locating and tracking the UE that sent them to the wireless communication network. RF signal strength measurements may also be requested by the wireless communication network to the UE even when no radio link (i.e., an active connection for performing communication) between the UE and the wireless communication network is set up.

RF signals strength maps are provided by means of radio signal propagation simulation tools and are generally generated and used for the planning/deployment of the wireless communication network. Such kind of radio signal propagation simulation tools are based on Radio Access Network (RAN) configuration information, including positions of radio communication stations and parameters of their antennas (which radio communication stations manages communication over respective portions of the coverage area of the wireless communication network). Furthermore, the radio signal propagation simulation tools may take into account ground morphology information (i.e., building profiles, ground profile, areas with dense forests etc.). A RF signals strength map provides one or more expected RF signal strengths for each pixel of the coverage area, particularly the expected strengths perceivable in such pixel of the RF signals by some radio communication stations located in the neighborhood of such pixel.

The quality of RF fingerprints estimated with radio signal propagation simulation tools may also be improved by on-site measurements (e.g., collected by means of a field measurement campaign performed on the whole coverage area by means of radio signal strength detectors) allowing an on-field tuning of the RF signals strength maps.

Several positioning methods based on RF fingerprint have been proposed in the art for locating UE inside the coverage area of the wireless communication network.

For example, Laitinen H., Lahteenmaki J., Nordstrom T., "Database correlation method for GSM location", Vehicular Technology Conference, 2001, VTC 2001 Spring, IEEE VTS 53rd, discloses a set of algorithms that can be used for locating UE in a wireless communication network.

D. Zimmermann, J. Baumann, M. Layh, F. Landstorfer, "Database Correlation for Positioning of Mobile Terminals in Cellular Networks using Wave Propagation Models", Vehicular Technology Conference, VTC 2004 Fall, discloses an algorithm for the estimation of the position of UE with RF fingerprint approach. The document does not address the problem of locating a UE indoor or inside vehicles.

U.S. Pat. No. 7,725,111 discloses a method for determining the location of a mobile unit in a wireless communication system and presenting it to a remote party. The location of a remote mobile unit is determined by comparing a snapshot of a predefined portion of the radio-frequency spectrum taken by the mobile unit to a reference database containing multiple snapshots taken at various locations. The result of the comparison is used to determine if the mobile unit is at a specific location. The comparison may be made in the mobile unit, or at some other location situated remotely from the mobile unit. In the latter case, sufficient information regarding the captured fingerprint is transmitted from the mobile unit to the remote location. The database may be pre-compiled or generated on-line.

Jian Zhu and Gregory D. Durgin, "Indoor/Outdoor Location of Cellular Handsets Based on Received Signal Strength", IEE Electronics Letters, 6 Jan. 2005, and Jian Zhu, School of Electrical and Computer Engineering Georgia Institute of Technology PhD thesis Indoor/Outdoor Location of Cellular Handsets Based on Received Signal Strength, (available, at the date of filing of the present application, at http://www.propagation.gatech.edu/Archive/PG_TR_060515_JZ/PG_TR_060515_JZ.pdf) describe a method to handle an attenuation associated with a position of the UE with single set of measurement or a sequence of signal strength measurements.

SUMMARY OF THE INVENTION

The Applicant has found that the known solutions mentioned above fail in providing a satisfactory positioning and tracking system capable of considering an estimation of signal losses due to obstacles that cannot be included in models used by radio signal propagation simulation tools for generating the RF signals strength map. As a result, RF signal strength maps calculated by radio signal propagation simulation tools substantially may provide accurate RF signal strengths referred to an outdoor environment of the coverage area, while an (actual) measured radio signal strength through signal strength measurements performed by the UE may be affected by attenuations caused by additional obstacles such as bodies of vehicles (i.e., when the UE is within a vehicle), walls of building (when the UE is within a building, whose walls losses are not known), or the elevation of the position of the user handling the UE inside a building with respect to the ground level (which in a first approximation may cause an increase of the signal strength). The field measurement campaigns mentioned above are not able to provide useful data regarding the attenuation introduced by such obstacles like vehicles or wall of buildings for an indoor environment within the coverage area.

Therefore, the Applicant has coped with the problem of devising a UE positioning and tracking method and system able to take into account signal strength attenuations (such as attenuations due to vehicles and buildings) not considered in signal strength prediction or measurement, thus allowing to identify with an improved accuracy UE positions.

The Applicant has found that, in order to take into account signal strength attenuations (such as attenuations due to vehicles and buildings) not considered in signal strength prediction or measurement, it is useful to identify an uncertainty area around an estimated UE position, and calculate an average expected signal strength in respect of the uncertainty area (e.g., an average of the expected signal strengths for neighboring pixels around the pixel corresponding to the estimated UE position). Such average of the expected signal strengths for neighboring pixels around the pixel corresponding to the estimated UE position can be used to refine the estimation of the signal strength attenuation.

Particularly, one aspect of the present invention proposes a method of identifying a position of a user equipment within a wireless communication network comprising at least one radio communication station transmitting radio signals over a geographic area. The method comprising the following steps: a) providing expected radio signal strengths produced by the at least one radio communication station on each of a plurality of elementary area elements in which the geographic area is subdivided; b) defining an initial attenuation experienced by the radio signals provided by the at least one radio communication station to the user equipment whose position is to be identified; c) obtaining measured radio signal strength measurements of the radio signals provided to the user equipment whose position is to be identified; d) determining an estimated elementary area element corresponding to the position of the user equipment whose position is to be identified on the basis of said expected radio signal strengths, said initial attenuation and said radio signal strength measurements, and e) computing a final attenuation on the basis of said estimated elementary area element. The steps b)-e) are iterated at least twice, with each further iteration of the step b) which comprises defining the respective initial attenuation for said each further iteration on the basis of at least one final attenuation previously computed in step e) of at least one previous iteration.

Preferred features of the present invention are set forth in the dependent claims.

In an embodiment of the present invention, a second iteration of the step b) comprises defining as the initial attenuation the final attenuation computed during the first iteration of step e).

In an embodiment of the present invention, each further iteration of the step b) comprises defining as initial attenuation an average of the final attenuations previously computed.

In an embodiment of the present invention, each further iteration of the step b) comprises defining as initial attenuation an average of at least part of the final attenuations previously computed.

In an embodiment of the present invention, said average is a weighted average.

In an embodiment of the present invention, said weighted average comprises weights based on an exponential decreasing function.

In an embodiment of the present invention, the step d) comprises determining the estimated elementary area element on the basis of a probability distribution of the position of the user equipment in the plurality of elementary area elements in which the geographic area is subdivided.

In an embodiment of the present invention, the step d) comprises determining a standard deviation of said probability distribution and the method further comprises the step of f) defining an uncertainty area centered on the estimated elementary area element and having a radius substantially corresponding to said standard deviation.

In an embodiment of the present invention, the step d) comprises determining the estimated elementary area element as a maximum of said probability distribution.

In an embodiment of the present invention, the step d) comprises determining the estimated elementary area element as a center of mass of an uncertainty area computed during a previous iteration of steps b)-e) or an initial search space in a first iteration of steps b)-e).

In an embodiment of the present invention, said probability distribution is based on a set of probabilities that the user equipment is within each one of the plurality of elementary area elements in which the geographic area is subdivided, the set of probabilities comprising a probability in respect of each radio communication station of the at least one radio communication station.

In an embodiment of the present invention, each probability of the set of probabilities is computed as:

$$p(x_{i,j})|_{a-h} = \frac{1}{2\pi\sqrt{\sigma_{i,j}}|_{a-h}} \times e^{-\frac{(ms|_{a-h} - es_{i,j}|_{a-h} - \mu_{ni})^2}{2\sigma_{i,j}^2|_{a-h}}},$$

wherein $es_{i,j|a-h}$ is the expected radio signal strength in the respective one of the elementary area elements of the plurality of elementary area elements, $\sigma_{i,j|a-h}$ is the standard deviation of a statistical error associated with said expected radio signal strength in the respective one of the plurality of elementary area elements, $ms_{|a-h}$ is the measured radio signal strength measurement and $\mu_{ni}$ initial attenuation of the n-th iteration.

In an embodiment of the present invention, each probability of the set of probabilities is normalized into a corresponding normalized probability before being used as a basis for said probability distribution.

In an embodiment of the present invention, said probability distribution is defined by a set of total probabilities each of which is computed as a product of the normalized probabilities associated with a same elementary area element of the plurality of elementary area elements.

In an embodiment of the present invention, the method further comprises the step of g) computing average expected radio signal strengths as an average of the expected radio signal strengths of each elementary area element comprised in the uncertainty area, and wherein the step e) comprises computing the final attenuation as an average of the differences between the average expected radio signal strengths and the measured radio signal strengths.

Another aspect of the present invention proposes a wireless communication network comprising a plurality of radio communication stations transmitting radio signals over a geographic area adapted to implement the method of above.

In an embodiment of the present invention, the wireless communication network is a mobile telephony network.

In an embodiment of the present invention, the wireless communication network is a Global Navigation Satellite System network.

BRIEF DESCRIPTION OF THE DRAWINGS

These and others features and advantages of the solution according to the present invention will be better understood by reading the following detailed description of an embodiment thereof, provided merely by way of non-limitative example, to be read in conjunction with the attached drawings, wherein.

DETAILED DESCRIPTION

Figure 1:
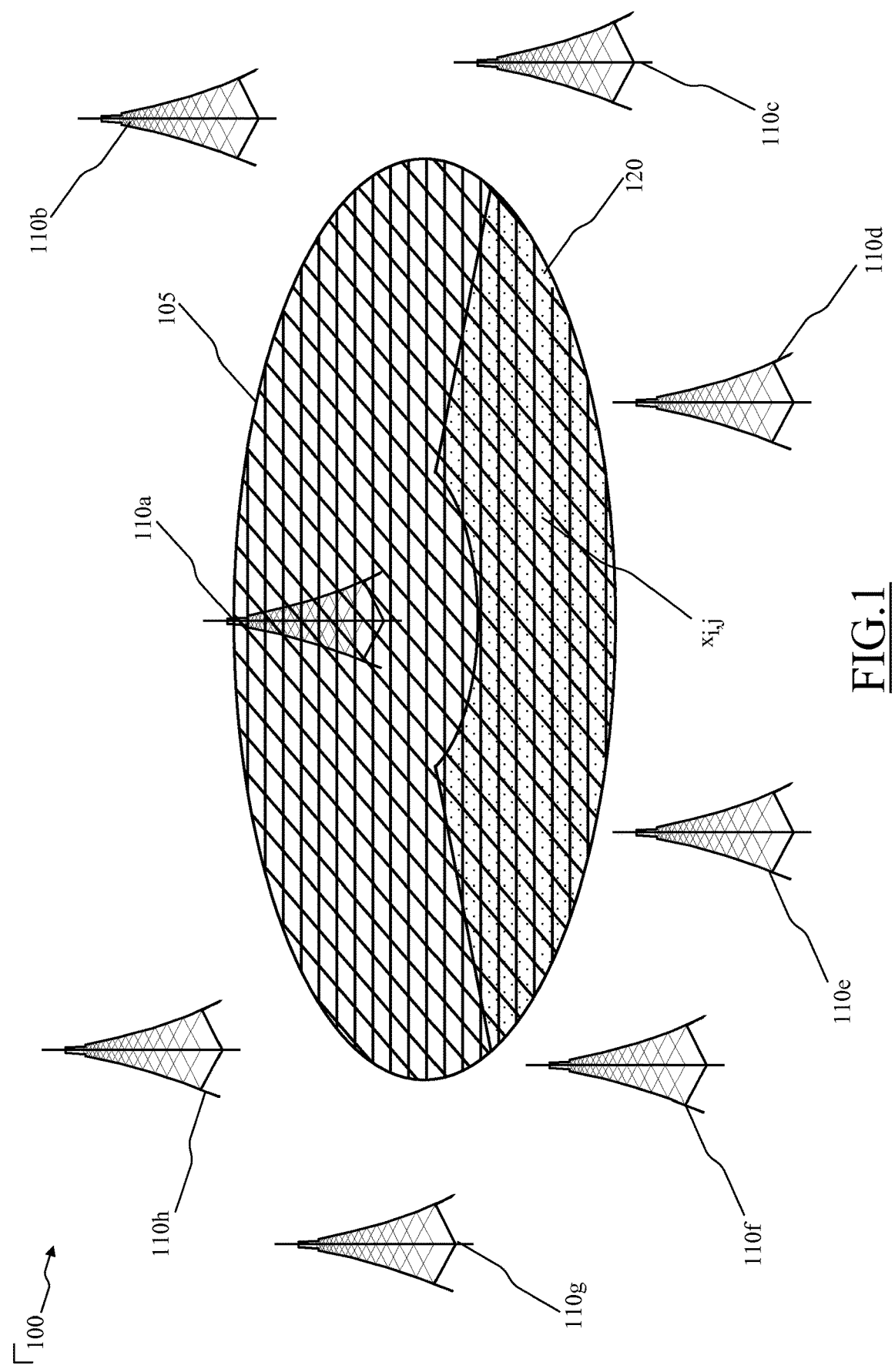
FIG. 1 is a schematic view of a portion of a wireless communication network in which a solution according to an embodiment of the present invention can be implemented.

With reference to the drawings, FIG. 1 is a schematic view of a portion of a wireless communication network in which an embodiment of the present invention can be implemented.

A generic wireless communication network 100 allows and manages communications over a coverage area (not shown) of user equipments or UE (e.g., mobile telephones, smartphones and tablets). Such a (geographic) coverage area is generally subdivided in a plurality of portions, such as the cell 105 in which communication is managed by a radio communication station. For example, in a wireless communication network 100 for mobile telephony, one or more radio transceivers (not shown) of a radio communication station 110a, such as an evolved Node B, or eNodeB in 3GPP Long Term Evolution (LTE)/LTE Advanced (LTE-A) systems, manage communications (i.e., transmission and/or reception of information, such as binary data packets) of the UE within the radio communication station coverage area or cell 105. A plurality of neighboring radio communication stations 110b-h (of which only seven are shown in the example of FIG. 1) manage the communication within respective cells (not shown) which are neighbor of the cell 105.

The coverage area is ideally subdivided into relatively small, elementary area elements or pixels $x_{i,j}$ (where $1 \leq i \leq I$ and $1 \leq j \leq J$, with I and J positive integer numbers), each pixel being an elementary, unit (in the shown example, the pixel are squares in shape) area of predefined width, e.g. 1" of latitude by 1" of longitude (even though different pixels not necessarily have the same size or shape). Therefore each cell, such as the cell 105, of the wireless communication network 100 is subdivided into a plurality of pixels $x_{i,j}$.

The levels of the electromagnetic field, i.e. the expected signal strengths $es_{i,j|a-h}$, produced by the radio communication stations 110a-h on the generic pixel $x_{i,j}$ are measured or calculated, e.g. by means of known radio signal propagation simulation tools or through an estimation taking into account the path loss model in each pixel and radio communication parameters (i.e. emitted power, antenna gain, antenna position) of the radio communication stations, and they are compared one another. Each pixel $x_{i,j}$ is then associated with the respective radio communication station 110a-h which, compared to all the other radio communication stations 110a-h, produces in the pixel $x_{i,j}$ the best expected signal strengths $es_{i,j|a-h}$. The set of pixels $x_{i,j}$ associated with a same radio communication station, such as the radio communication station 110a, define the cell, such as the cell 105, of the respective radio communication station.

At the same time, the expected signal strengths $es_{i,j|a-h}$ measured or calculated by the radio signal propagation simulation tools or based on the above cited path loss estimation generate a RF signals strength map, which is a database that, for each pixel $x_{i,j}$, comprises the expected signal strengths $es_{i,j|a-h}$ related to the radio communication stations 110a-h of the wireless communication network 100. The RF signals strength map, for each expected signal strength $es_{i,j|a-h}$, further comprises an indication of a statistical error, such as a standard deviation $\sigma_{i,j|a-h}$ that affects such expected signal strength $es_{i,j|a-h}$.

It should be noted that the RF signals strength map of the wireless communication network 100 may have been already generated during a network planning phase of the wireless communication network 100 and therefore such a RF signals strength map may be used for positioning and tracking purposes, without the need of generating a new RF signals strength map.

In addition, the wireless communication network 100 has a certain positioning capability, i.e. the wireless communication network 100 may provide a rough estimation of the position, within its coverage area, of UE (not shown).

For example, by considering the case in which the wireless communication network 100 is a mobile telephony network, the wireless communication network 100 knows in which cell, e.g. the cell 105, the UE is located, since the wireless communication network 100 is aware of the radio communication station, e.g. the radio communication station 110a, associated with (i.e., serving) such UE. Furthermore, the wireless communication network may identify in which portion of cell or sector of the cell 105 the UE is located by identifying with which radio transceivers of the radio communication station 110a the UE is associated.

In addition, the wireless communication network 100 may identify a distance between the UE and the radio communication station 110a by means of a timing advance value corresponding to the length of time a signal takes to reach the communication station from the UE. Therefore, the wireless communication network may identify a portion of the sector of the cell 105 in which the UE is located. Such sector portion can be used as an initial search space 120 for accurately locating the UE in a method according to an embodiment of the present invention.

Figure 2A:
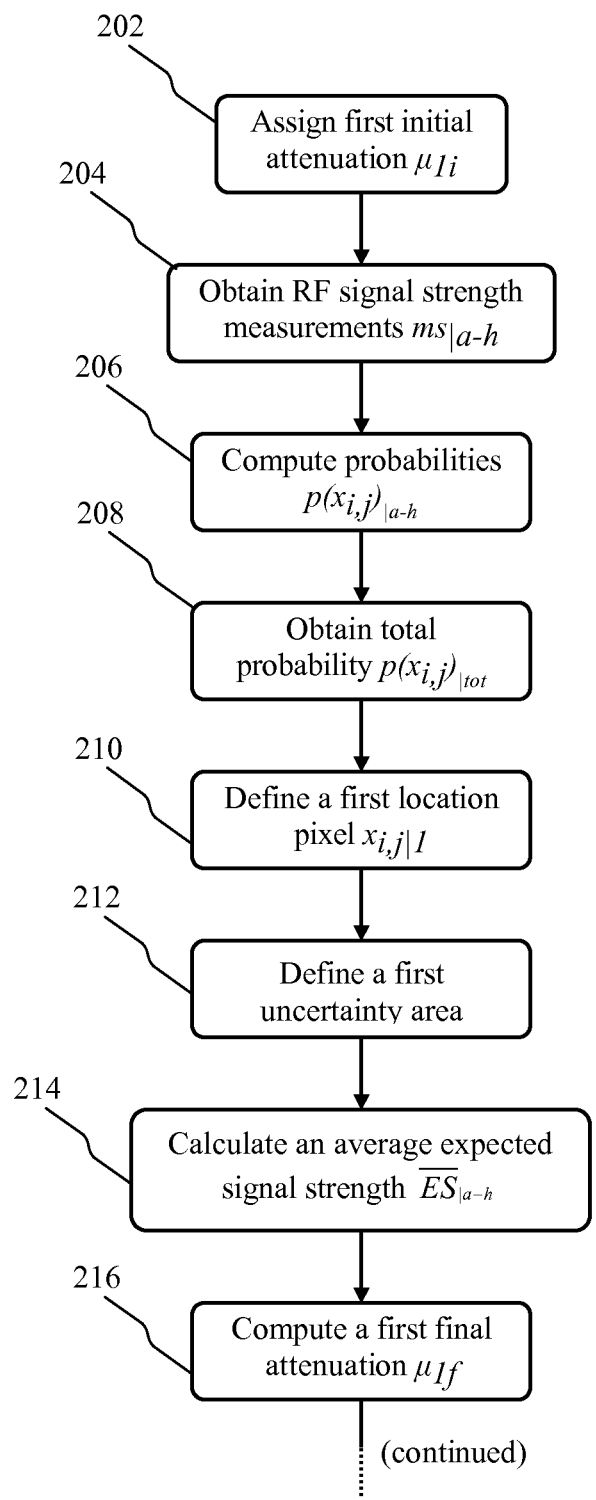
FIGS. 2A-2C is a schematic flowchart of a positioning and tracking method according to an embodiment of the present invention.
Figure 2B:
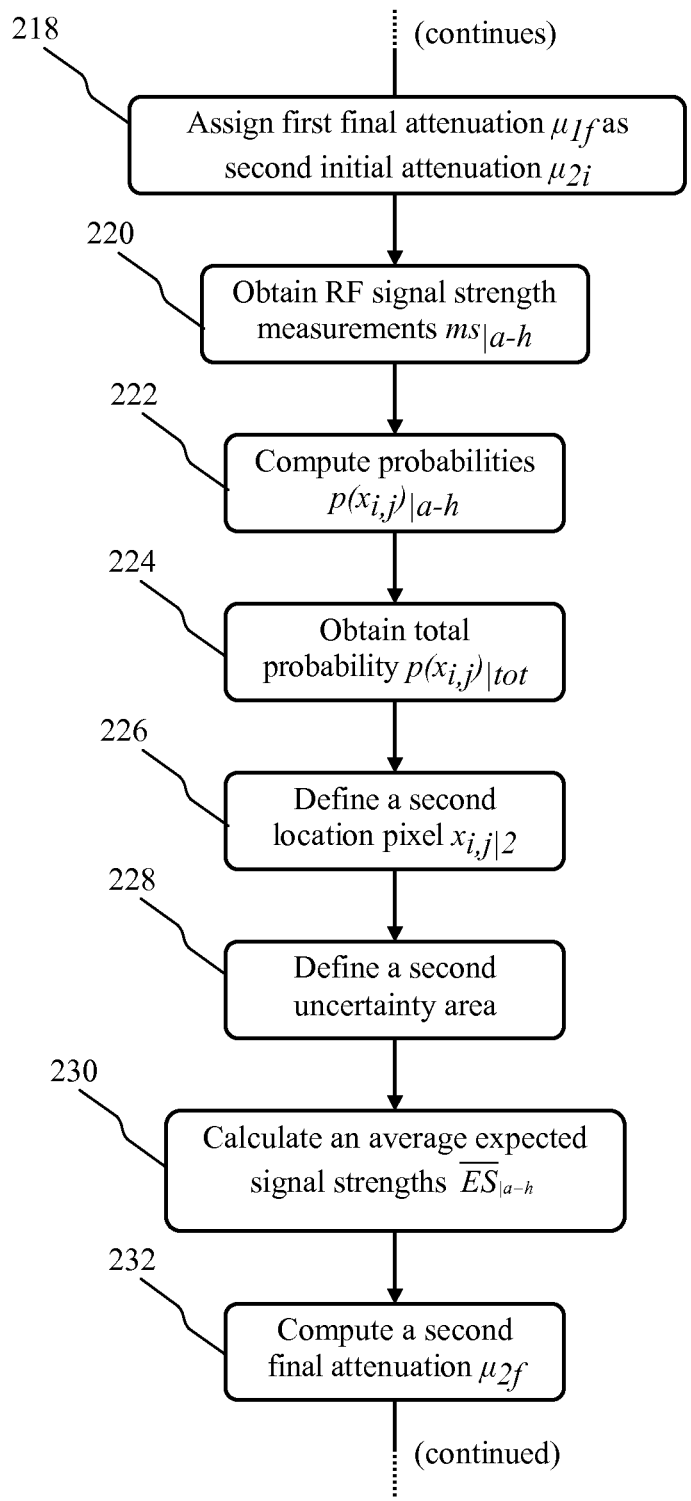
Figure 2C:
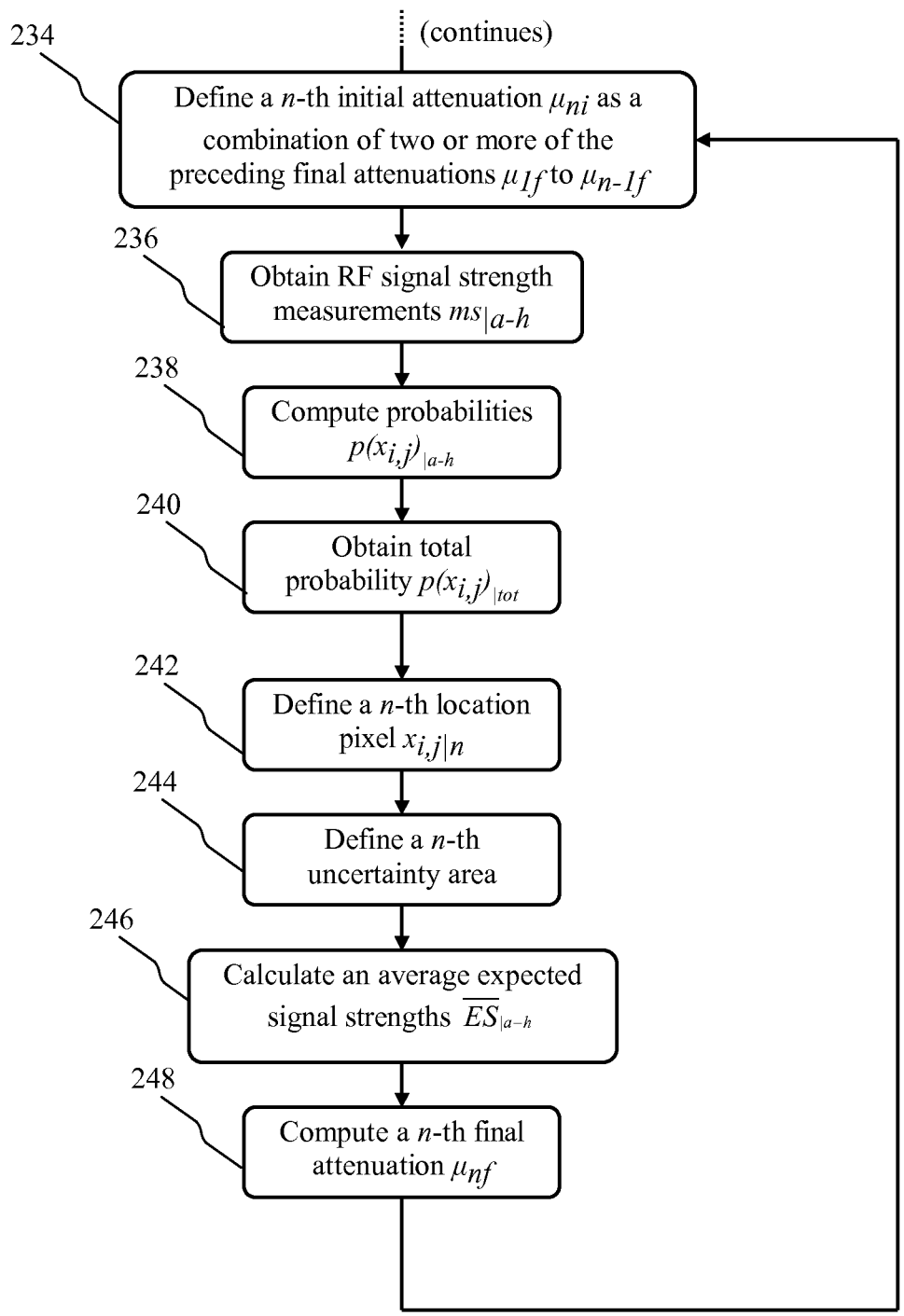

Turning now to FIGS. 2A-2C, they are a schematic flowchart of a positioning method according to an embodiment of the present invention.

Initially, a initialization phase comprising a first and a second UE position estimation cycles is performed.

The first UE position estimation cycle determines a first UE estimated position of a UE inside the search space 120. A first initial attenuation value, or simply first initial attenuation $\mu_{1i}$, is assigned to each pixel $x_{i,j}$ of the search space 120 (step 202) for taking into account a probable signal attenuation experienced by signals transmitted by the serving radio communication station taking into account losses not considered in the expected signal strengths for each pixel in the RF signals strength map.

In an embodiment of the invention, the first initial attenuation $\mu_{1i}$ is a constant value comprised in a predetermined range of values, for example the first initial attenuation $\mu_{1i}$ is comprised between 0 dB and 10 dB, such as for example $\mu_{1i}$=5 dB.

In another embodiment of the invention, the first initial attenuation $\mu_{1i}$ is a constant value selected from a table of attenuation values that lists a plurality of attenuation values for not modeled obstacle(s) (for example, 8 dB if an in-vehicle scenario should be considered).

Then (step 204), measured RF signal strengths $ms_{|a-h}$ measured by the UE with respect to each one of the radio communication stations 110a-h (which provide a signal strength above a minimum threshold) are obtained. Such measured RF signal strengths $ms_{|a-h}$ are periodically sent by UE to the wireless communication network 100 for call management and, moreover, the measurements may also be requested by the wireless communication network 100 to the UE even when no radio link is set up (i.e., an active connection for performing communication).

Afterwards (step 206), a set of probabilities that the UE is within the generic pixel $x_{i,j}$ of the search space 120 is determined for each pixel of the search space 120. The set of probabilities preferably comprises a probability $p(x_{i,j})|_{a-h}$ in respect of each radio communication station 110a-h (eight in the example of FIG. 1) for which a respective expected signal strength $es_{i,j|a-h}$ is comprised in the RF signals strength map.

In an embodiment of the invention, for each pixel $x_{i,j}$ of the search space 120 a plurality of (eight in the considered example) respective probabilities $p(x_{i,j})|_{a-h}$ can be computed (one for each of the—eight in the considered example—radio communication stations 110a-h) according to the following formula:

$$p(x_{i,j})|_{a-h} = \frac{1}{2\pi\sqrt{\sigma_{i,j}}\big|_{a-h}} \times e^{-\frac{(ms|_{a-h}-es_{i,j}|_{a-h}-\mu_{1i})^2}{2\sigma_{i,j}^2|_{a-h}}}, \quad (1)$$

wherein $\sigma_{i,j|a-h}$ is the standard deviation of the statistical error that affects such expected signal strength $es_{i,j|a-h}$ associated with the pixel $x_{i,j}$ of the search space 120.

Preferably, albeit not strictly necessarily, normalized probabilities $p_{norm}(x_{i,j})|_{a-h}$ are used in the subsequent calculations, where the normalized probabilities $p_{norm}(x_{i,j})|_{a-h}$ are calculated as follows:

$$p_{norm}(x_{i,j})|_{a-h} = \frac{p(x_{i,j})|_{a-h}}{\sum_{x_{i,j}} p(x_{i,j})\Big|_{a-h}} = \frac{\frac{1}{2\pi\sqrt{\sigma_{i,j}}\big|_{a-h}} \times e^{-\frac{(ms|_{a-h}-es_{i,j}|_{a-h}-\mu_{1i})^2}{2\sigma_{i,j}^2|_{a-h}}}}{\sum_{x_{i,j}} p(x_{i,j})\Big|_{a-h}}, \quad (2)$$

whereby:

$$\sum_{x_{i,j}} p_{norm}(x_{i,j})\Big|_{a-h} = 1. \quad (3)$$

For each pixel $x_{i,j}$ of the search space 120 the (eight in the considered example) calculated (normalized) probabilities $p_{norm}(x_{i,j})|_{a-h}$ are then combined (step 208) in such a way to obtain a total probability $p(x_{i,j})|_{tot}$ that the UE is located within that pixel $x_{i,j}$. In an embodiment of the invention, since the radio signal propagation behavior (radio signal attenuation) of each radio signal is independent from the others, the total probability $p(x_{i,j})|_{tot}$ for the pixel $x_{i,j}$ can for example be computed as a product of the (eight in the considered example) probabilities $p_{norm}(x_{i,j})|_{a-h}$, i.e.:

$$p(x_{i,j})|_{tot} = \prod_{k=a}^{h} p_{norm}(x_{i,j})\Big|_{k}. \quad (4)$$

This is not the case when common residual attenuations are based on the same measurements.

It should be noted that the total probabilities $p(x_{i,j})|_{tot}$ of all the pixels $x_{i,j}$ of the search space 120 define a first position probability distribution $d_1(x_{i,j})$ of the (possible) position of the UE in the search space 120 that has generally a Gaussian shape.

By using the total probabilities $p(x_{i,j})|_{tot}$ calculated for all the pixels $x_{i,j}$ of the search space 120, a first location pixel $x_{i,j|1}$ is identified (step 210). In an embodiment of the present invention, a first center of mass, or first centroid $C_{1d}$, of the search space 120 is determined based on the total probabilities $p(x_{i,j})|_{tot}$ calculated for all the pixels $x_{i,j}$ of the search space 120, that is on the basis of the first position probability distribution $d_1(x_{i,j})$, and such a centroid is selected as the first location pixel $x_{i,j|1}$.

Figure 3A:
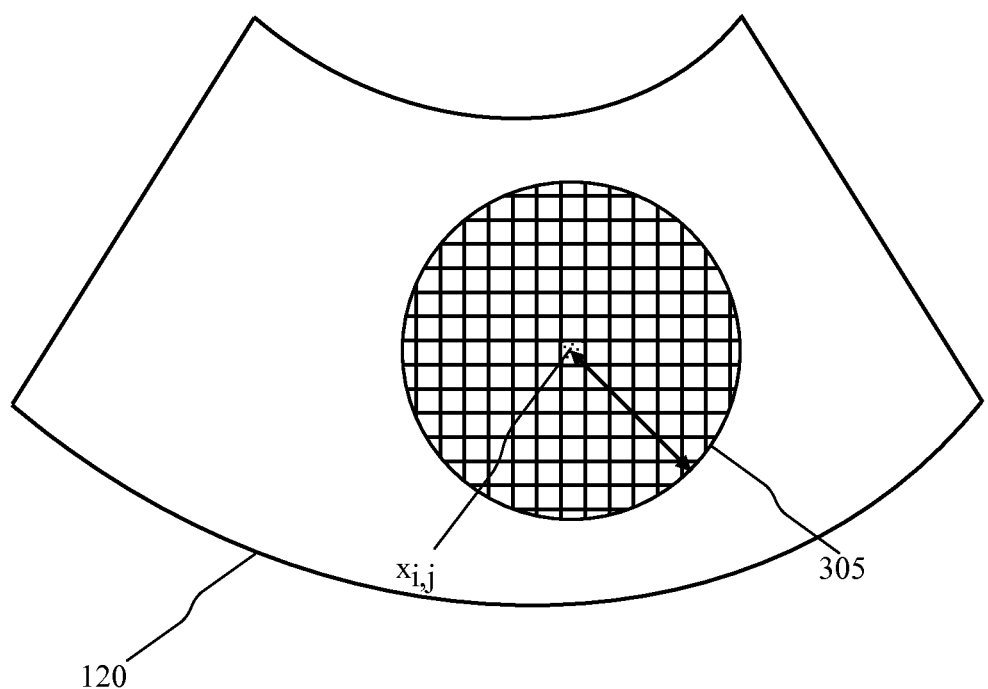
FIGS. 3A-3C are schematic views of search spaces showing an uncertainty area in which the user equipment to be positioned is located according to an embodiment of the present invention.

Next (step 212), a first uncertainty area 305 is defined. As shown in FIG. 3A, which is a schematic view of the search space 120 showing the first uncertainty area 305 in which the UE whose position is to be determined is located according to an embodiment of the present invention, the first uncertainty area 305 is defined as a circular area of the search space 120 centered on the first location pixel $x_{i,j|1}$, i.e. the first centroid $C_{1d}$. A radius of the first uncertainty area 305 is defined as substantially corresponding to a first standard deviation $\Sigma_{1d}$ of the first position probability distribution $d_1(x_{i,j})$ computed centered in the first location pixel $x_{i,j|1}$, i.e. the first centroid $C_{1d}$.

In an alternative embodiment of the invention, the generic pixel $x_{i,j}$ of the search space 120 being associated with a first maximum $M_{1d}$ of the first position probability distribution $d_1(x_{i,j})$ is selected as the first location pixel $x_{i,j|1}$, and the radius of the first uncertainty area 305 is defined as the first standard deviation $\Sigma_{1d}$ of the first position probability distribution $d_1(x_{i,j})$ computed centered at the first location pixel $x_{i,j|1}$, i.e. the first maximum $M_{1d}$.

In order to refine the estimation of the UE position, a first final attenuation $\mu_{1f}$ is computed at the end of the first position estimation cycle (steps 214 and 216). Since the estimation of the UE position is affected by an error, the calculation of the expected signal strength should take into account an average expected signal strength estimated over the uncertainty area, by using a plurality of pixels around the estimated position. Thus, firstly (step 214) average expected signal strengths $\overline{ES}_{|a-h}$ are calculated for the whole uncertainty area 305, i.e.:

$$\overline{ES}_{|a-h} = \frac{\sum_{i,j=1}^{Iu,Ju} es_{i,j|a-h}}{\#\text{pixels}}, \quad (5)$$

where $1 \leq i \leq Iu$ and $1 \leq j \leq Ju$ (with $Iu \leq I$ and $Ju \leq J$) indicate the coordinates of pixels $x_{i,j}$ comprised within the uncertainty area 305, and #pixels indicates the number of pixel $x_{i,j}$ comprised within the first uncertainty area 305.

Then (step 216), the first final attenuation $\mu_{1f}$ is computed as the average of the (eight, in the considered example)

differences between the average expected signal strengths $\overline{ES}_{|a-h}$ and the (eight, in the considered example) measured signal strengths $ms_{|a-h}$, i.e.:

$$\mu_{1f} = \frac{\sum_{k=a}^{h} \left|\overline{ES}_{|k} - ms\right|_k}{\#rcs}, \tag{6}$$

where #rcs is the number (eight, in the considered example) of radio communication stations for which the UE has measured useful (i.e. above the minimum threshold) measured signal strengths $ms_{|a-h}$, i.e. eight radio communication station 110a-h in the example of FIG. 1. With the computation of the first final attenuation $\mu_{1f}$ the first position estimation cycle ends.

At the end of the first position estimation cycle the method provides a first position estimation for the UE whose position is to be identified, i.e. the first location pixel $x_{i,j|1}$, and also defines the first uncertainty area 305 that takes into account statistical errors associated with such estimation.

Subsequently, the estimation of the UE position can be re-calculated by replacing the first initial attenuation $\mu_{1i}$ with the first final attenuation $\mu_{1f}$ resulting at the end of the first position estimation. Thus, the second position estimation cycle starts. The second position estimation cycle performs substantially the same steps as the first position estimation cycle but uses the first final attenuation $\mu_{1f}$ calculated at the end of the first position estimation cycle as second initial attenuation $\mu_{2i}$ (step 218). As in the previous cycle, measured RF signal strengths $ms_{|a-h}$ are obtained (or, alternatively, the same measured RF signal strengths $ms_{|a-h}$ used in the first position estimation cycle are recovered) (step 220) and the measured RF signal strengths are used for computing a set of probabilities that the UE is within the generic pixel $x_{i,j}$ of the first uncertainty area 305 (in the considered example, eight probabilities are calculated for each pixel of the first uncertainty area 305) (step 222). The (in the considered example, eight) probabilities $p(x_{i,j})|_{a-h}$ calculated for the generic pixel $x_{i,j}$ of the first uncertainty area 305 (possibly normalized as described above in connection with the first position estimation cycle) are then combined (step 224) in such a way to obtain, for that generic pixel $x_{i,j}$ of the first uncertainty area 305, a total probability $p(x_{i,j})|_{tot}$ that the UE is located within the generic pixel $x_{i,j}$ of the first uncertainty area 305. By using the total probabilities $p(x_{i,j})|_{tot}$ (or, a corresponding second position probability distribution $d_2(x_{i,j})$) that the UE is located within the generic pixel $x_{i,j}$ of the first uncertainty area 305 a second centroid $C_{2d}$, of the first uncertainty area 305 is determined, and a second location pixel $x_{i,j|2}$ is identified as corresponding to the second centroid $C_{2d}$ (or, alternatively, to a second maximum $M_{2d}$ of the second position probability distribution $d_2(x_{i,j})$) (step 226).

Figure 3B:
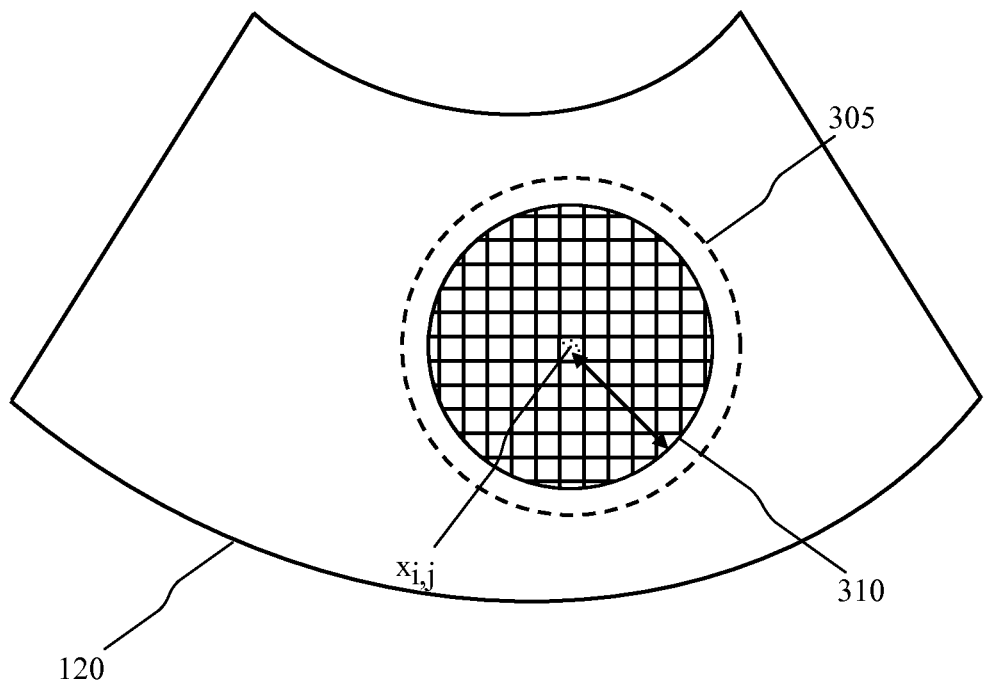

Next (step 228), a second uncertainty area 310 is defined, as shown in FIG. 3B, which is a schematic view of the search space 120 showing the second uncertainty area 310 in which the UE whose position is to be determined is located according to an embodiment of the present invention. Similarly to the first position estimation cycle, a radius of second uncertainty area 310 is defined as substantially corresponding to a second standard deviation $\Sigma_{2d}$ of the second position probability distribution $d_2(x_{i,j})$ computed centered at the second location pixel $x_{i,j|1}$, i.e. the second centroid $C_{2d}$ (or alternatively as a second standard deviation $\Sigma_{2d}$ centered at the second maximum $M_{2d}$ of the second position probability distribution $d_2(x_{i,j})$).

In order to refine the position estimation, a second final attenuation $\mu_{2f}$ is computed at the end of the second position estimation cycle (steps 230 and 232) analogously to the first position estimation cycles, i.e. average expected signal strengths $\overline{ES}_{|a-h}$ are calculated for the whole second uncertainty area 310 and the second final attenuation $\mu_{2f}$ is computed as the average of the (eight, in the considered example) differences between the average expected signal strengths $\overline{ES}_{|a-h}$ and the (eight, in the considered example) measured signal strengths $ms_{|a-h}$.

At the end of the second position estimation cycle the method provides a second position estimation for the UE whose position is to be identified, i.e. the second location pixel $x_{i,j|2}$, and also in this case the second uncertainty area 310 (that is smaller than the first uncertainty area 305) takes into account statistical errors associated with such second position estimation.

It should be noted that, generally, the first centroid $C_{1d}$ (or the first maximum $M_{1d}$) used as the center of the first uncertainty area 305 and the second centroid $C_{2d}$ (or the second maximum $M_{2d}$) used as the center of the second uncertainty area 310 do not necessarily correspond. Therefore, the first uncertainty area 305 and the second uncertainty area 310 are generally eccentric areas.

With the end of the second position estimation cycle the positioning initialization phase ends and subsequent position estimation cycles are preferably performed in the following manner.

Substantially, the generic n-th position estimation cycle performs the same steps of the first position estimation cycle but uses a n-th initial attenuation $\mu_{ni}$ based on a combination of two or more of the previously calculated final attenuations $\mu_{1f}$ to $\mu_{n-1f}$ (step 234).

The n-th initial attenuation $\mu_{ni}$ may be computed in a plurality of different manner; for example, the n-th initial attenuation $\mu_{ni}$ may be computed depending on whether the UE whose position is to be estimated is moving or has a substantially static position in order to obtain a better estimation of the position of the UE.

In case the UE whose position is to be estimated has a substantially static position, the n-th initial attenuation $\mu_{ni}$ may be advantageously computed as the average of the all the previously calculated final attenuations $\mu_{1f}$ to $\mu_{n-1f}$, i.e.:

$$\mu_{ni} = \frac{\sum_{k=1}^{n-1} \mu_{kf}}{n-1}. \tag{7}$$

For example, the third initial attenuation $\mu_{3i}$ may be computed as the average of the first final attenuation $\mu_{1f}$ and second final attenuation $\mu_{2f}$, i.e.:

$$\mu_{3i} = \frac{\mu_{1f} + \mu_{2f}}{2}. \tag{8}$$

Alternatively, either in case the UE is moving or has a substantially static position, the n-th initial attenuation $\mu_{ni}$ may be computed by averaging only a subset of the previously calculated final attenuations $\mu_{1f}$ to $\mu_{n-1f}$, for example by calculating a moving average calculated by taking a moving "averaging window" that may be defined for computing the n-th initial attenuation $\mu_{ni}$ and which comprises a certain number k of previously calculated final attenuations $\mu_{n-kf}$ to $\mu_{n-1f}$.

The use of a moving averaging window may be particularly advantageous in case the not modeled environment conditions introduce signal attenuations change over time (e.g., in case the UE moved from inside a building to the outdoor environment). Indeed, during UE movements in the area of coverage of the wireless communication network 100, the not modeled attenuation affecting radio signals may vary; therefore, taking into account the whole set of attenuations already computed in the past may be misleading if a movement of the UE to be positioned is detected.

In addition, the n-th initial attenuation $\mu_{ni}$ may be computed as a weighted average of some or more, possibly all the previously calculated final attenuations $\mu_{1f}$ to $\mu_{n-1f}$. This is particularly advantageous in the case of a UE that is moving, i.e. in case of a UE tracking within the wireless communication network 100 during which the not modeled attenuation may vary. For example, the weights may be defined on the basis of an exponential decreasing function.

Figure 3C:
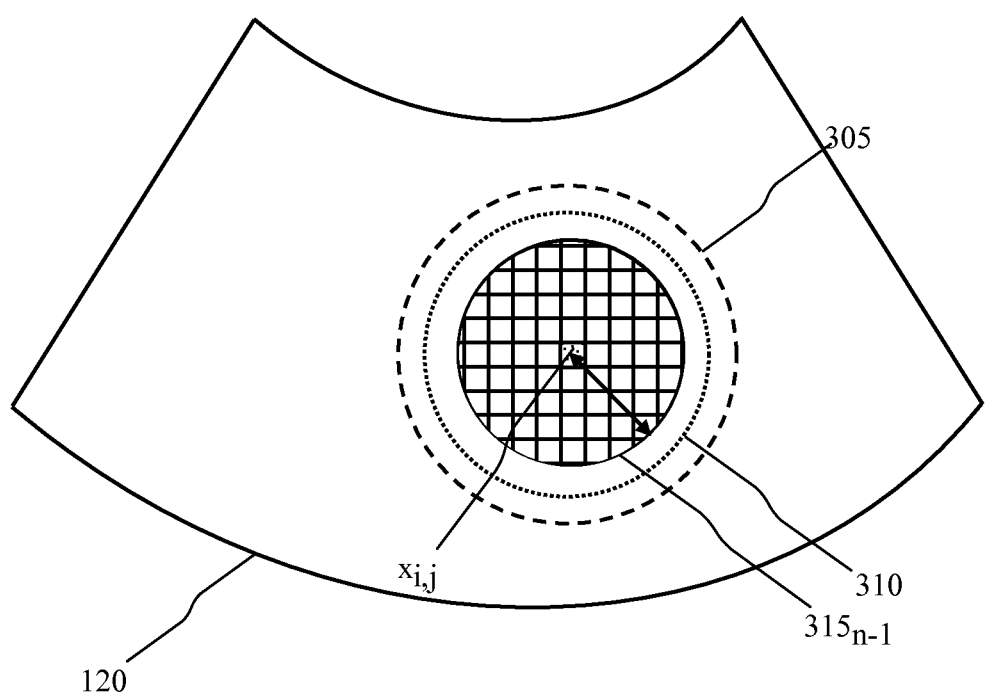

In the generic n-th position estimation cycle new measured RF signal strengths $ms_{|a-h}$ are obtained (or alternatively the same measured signal strengths $ms_{|a-h}$ used in the previous position estimation cycle(s) are recovered) (step 236) and the measured RF signal strengths are used for computing a set of probabilities $p(x_{i,j})|_{a-h}$ that the UE is within the generic pixel $x_{i,j}$ of the (n–1)-th uncertainty area $315_{n-1}$, as shown in as shown in FIG. 3C, which is a schematic view of the search space 120 showing the (n–1)-th uncertainty area $315_{n-1}$ in which the UE to be positioned is located, (in the considered example, eight probabilities are calculated for each pixel of the (n–1)-th uncertainty area $315_{n-1}$) (step 238). The (in the considered example, eight) probabilities $p(x_{i,j})|_{a-h}$ calculated for the generic pixel $x_{i,j}$ of the (n–1)-th uncertainty area $315_{n-1}$ (possibly normalized as described in connection with the first position estimation cycle) are then combined (step 240) in such a way to obtain, for that generic pixel $x_{i,j}$ of the (n–1)-th uncertainty area $315_{n-1}$, a total probability $p(x_{i,j})|_{tot}$ that the UE is located within the generic pixel $x_{i,j}$. By using the total probabilities $p(x_{i,j})|_{tot}$ (that is, the corresponding position probability distribution $d_n(x_{i,j})$) that the UE is located within the generic pixel $x_{i,j}$ of the (n–1)-th uncertainty area $315_{n-1}$, a n-th center of mass $C_{nd}$ for the n-th uncertainty area $315_n$ is determined, and a n-th location pixel $x_{i,j|n}$ is identified as corresponding to the n-th center of mass $C_{nd}$ (or, alternatively, to the n-th maximum $M_{nd}$ of the corresponding position probability distribution $d_n(x_{i,j})$) (step 242).

Figure 3D:
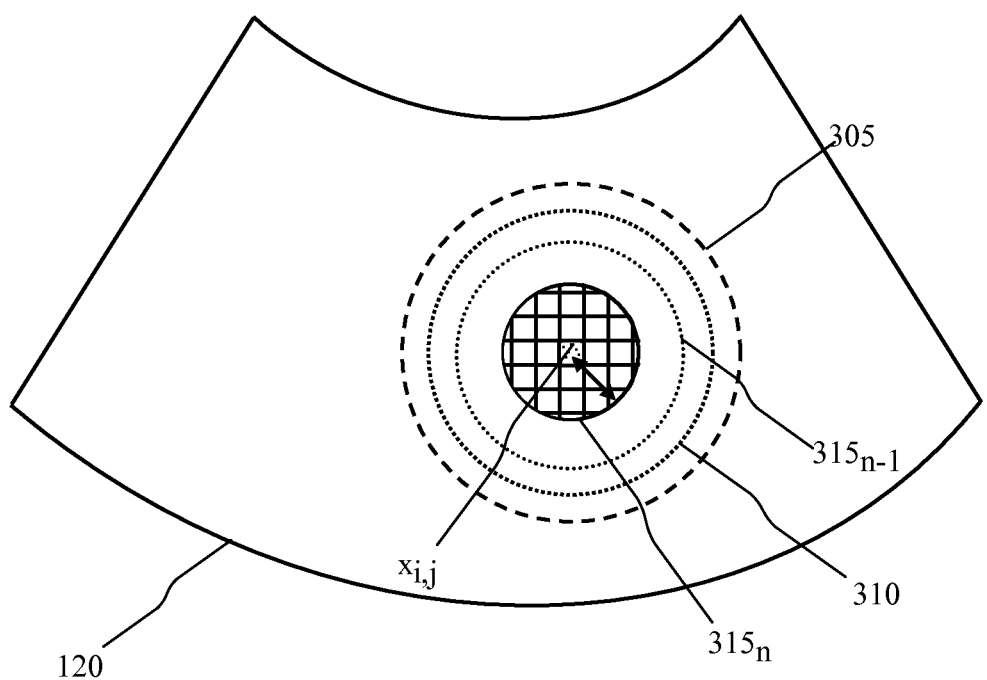

Next (step 244), a n-th uncertainty area $315_n$ is defined—as shown in FIG. 3D, which is a schematic view of the search space 120 showing the n-th uncertainty area $315_n$ in which the UE whose position is to be determined is located. Similarly to the previous position estimation cycles, a radius of the n-th uncertainty area $315_n$ is defined as substantially corresponding to a n-th standard deviation $\Sigma_{nd}$ of the n-th position probability distribution $d_n(x_{i,j})$ computed centered at the n-th location pixel $x_{i,j|1}$, i.e. the n-th centroid $C_{2d}$ (or alternatively as a n-th standard deviation $\Sigma_{nd}$ centered in the n-th maximum $M_{nd}$ of the n-th position probability distribution $d_n(x_{i,j})$).

Finally, a n-th final attenuation $\mu_{nf}$ is computed (steps 246 and 248). Similarly to the previous position estimation cycles, average expected signal strengths $\overline{ES}_{|a-h}$ are calculated (steps 246) for the whole n-th uncertainty area $315_n$, i.e.:

$$\overline{ES}_{|a-h} = \frac{\sum_{i,j=1}^{Iu',Ju'} es_{i,j|a-h}}{\#\text{pixels}}, \quad (9)$$

where $1 \leq i \leq Iu'$ and $1 \leq j \leq Ju'$ (with $Iu' \leq I$ and $Ju' \leq J$) indicate the coordinates of pixels $x_{i,j}$ comprised within the n-th uncertainty area $315_n$, and #pixels indicates the number of pixel $x_{i,j}$ comprised within the n-th uncertainty area $315_n$.

Then (step 248), the n-th final attenuation $\mu_{nf}$ is computed as the average of the (eight, in the considered example) differences between the average expected signal strengths $\overline{ES}_{|a-h}$ and the (eight, in the considered example) measured signal strengths $ms_{|a-h}$, i.e.:

$$\mu_{nf} = \frac{\sum_{k=a}^{h} \left| \overline{ES}_{|k} - ms \right|_k}{\#rcs}, \quad (10)$$

where #rcs is the number (eight, in the considered example) of radio communication stations for which the UE has measured useful (i.e. above the minimum threshold) measured signal strengths $ms_{a-h}$, i.e. eight radio communication station 110a-h in the example of FIG. 1.

At the end of the n-th position estimation cycle the method provides a n-th estimation of the position estimation for the UE whose position is to be determined, i.e. the n-th location pixel $x_{i,j|n}$ and also defines the n-th uncertainty area $315_n$ (smaller than the previous uncertainty area 305 to $315_{n-1}$) that takes into account statistical errors associated with such estimation.

Then operation returns to step 234 for refining further the position estimation by performing a further position estimation cycle (i.e., the steps 234 to 248 are reiterated).

If there is no outstanding correlation between the measured signal strengths $ms_{|a-h}$ associated with the (eight in the considered example) radio communication stations 110a-h and the expected signal strengths $es_{i,j|a-h}$ of pixels $x_{i,j}$ around (i.e., within the n-th uncertainty area $315_n$) the estimated position, i.e. the n-th location pixel $x_{i,j|n}$, the n-th final attenuation $\mu_{nf}$ may be excluded and not used in determining the next (n+1)-th initial attenuation. In this case, the (n+1)-th initial attenuation is not based on the immediately previous n-th final attenuation $\mu_{nf}$ (but only based on final attenuations comprised in a set going from the first final attenuation $\mu_{1f}$ to the (n–1)-th final attenuation) the error affecting the measured signal strengths $ms_{|a-h}$ at the (n+1)-th step are independent one another and the total probabilities $p(x_{i,j})|_{tot}$ can be again calculated through equation (4).

Thanks to the method according to an embodiment of the invention, it is possible to perform a continuous and self-refining positioning and a tracking of UE within the wireless communication network that take into account estimation of losses due to obstacles that cannot be included in models used by RF signal strength prediction tools or path loss estimation for generating the RF signals strength map; thus an improved accuracy in the positioning of UE within the wireless communication network is attained.

The method according to an embodiment of the invention is adapted to refine at each cycle the attenuation value starting from a selected value to a final value substantially corresponding to a real attenuation term affecting the signal to/from the UE; therefore the method according to an embodiment of the invention is particularly adapted for positioning and tracking purposes even when measured signal strengths are affected by attenuations caused by additional obstacles such as vehicles (i.e., when the UE is within a vehicle), the foliage that varies according to the season, walls of building (when the UE is within a building, whose walls losses are not known), or the elevation of the position of the user handling the UE in a building with respect to the ground level (which in a first approximation may cause an increase of the signal strength) which vary in time and/or that cannot be successfully modeled in radio propagation tools.

It should be apparent to those skilled in the art that embodiments of the present invention are not limited to terrestrial wireless communication networks. In an embodiment of the invention, the wireless communication network is a satellite communication or navigation system such as the Global Navigation Satellite System (GNSS), such as GPS, Glonass or Galileo.

In this case, UE signal strength measurements are obtained in respect of signals provided by GNSS satellites in view and/or ground repeater antennas in range and expected signal strength are obtained from a corresponding GNSS signal strength map. In other words, the positioning method described above with respect to the wireless communication network 100 for mobile telephony, may be substantially straightforwardly applied to a Global Navigation Satellite System, by using, as expected signal strengths $es_{i,j|a-h}$, signal strength values taken from the GNSS signal strength map, instead of the expected signal strengths of the radio signals irradiated by the radio communication stations 110*a-h*. Referring back to equation (1), in such a case the terms $ms_{|a-h}$ represent measures, performed by the UEs, of the received GNSS signals.

It should be noted that, since an initial GNSS positioning is more accurate that an initial positioning (i.e., the search area 120) provided by the mobile telephony network, the loss (i.e. the attenuation) estimation is more accurate and the positioning and tracking achievable through the proposed invention provides an even better accuracy than in the case of mobile telephony networks.

In particular, the accuracy of correction of the estimation of the position of UE exploiting GNSS signal strength maps may be improved by implementing the method end system according to the present invention in scenarios where the accuracy of the GNSS positioning may be degraded, such as for example in urban canyons scenario where the shadowing and the diffraction of RF signals caused by buildings may reduce an number of GNSS satellites actually in view and/or cause electromagnetic fields propagation delays (i.e., delays that affect the RF signals).

The invention claimed is:

1. A method of identifying a position of a user equipment within a wireless communication network including at least one radio communication station transmitting radio signals over a geographic area, the method comprising:
   a) identifying a sector portion used as an initial search space within the geographic area based on a timing advance value used in communications with the at least one radio communication station, the timing advance value corresponding to a length of time a signal takes to reach the at least one radio communication station from the user equipment;
   b) providing expected radio signal strengths produced by the at least one radio communication station on each of a plurality of elementary area elements in which the initial search space of the geographic area is subdivided;
   c) defining an initial attenuation experienced by the radio signals provided by the at least one radio communication station to the user equipment whose position is to be identified based on a table that lists a plurality of predetermined attenuation values, in decibels, for unmodeled obstacles;
   d) obtaining measured radio signal strength measurements of the radio signals provided to the user equipment whose position is to be identified;
   e) determining an estimated elementary area element corresponding to the position of the user equipment whose position is to be identified based on the expected radio signal strengths, the initial attenuation, and the radio signal strength measurements; and
   f) computing a final attenuation on the basis of the estimated elementary area element,
   wherein the c)-f) are iterated at least twice, with each further iteration of c which comprises defining the respective initial attenuation for the each further iteration on the basis of at least one final attenuation previously computed in f) of at least one previous iteration.

2. The method according to claim 1, wherein a second iteration of c) comprises defining as the initial attenuation the final attenuation computed during the first iteration of f).

3. The method according to claim 1, wherein each further iteration of c) comprises defining as initial attenuation an average of the final attenuations previously computed.

4. The method according to claim 1, wherein each further iteration of c) comprises defining as initial attenuation an average of at least part of the final attenuations previously computed.

5. The method according to claim 3, wherein the average is a weighted average.

6. The method according to claim 5, wherein the weighted average comprises weights based on an exponential decreasing function.

7. The method according to claim 1, wherein e) comprises determining the estimated elementary area element based on a probability distribution of the position of the user equipment in the plurality of elementary area elements in which the initial search space of the geographic area is subdivided.

8. The method according to claim 7, wherein e) comprises determining a standard deviation of the probability distribution, and the method further comprises:
   g) defining an uncertainty area centered on the estimated elementary area element and having a radius substantially corresponding to the standard deviation.

9. The method according to claim 7, wherein e) comprises determining the estimated elementary area element as a maximum of the probability distribution.

10. The method according to claim 8, wherein e) comprises determining the estimated elementary area element as a center of mass of an uncertainty area computed during a previous iteration of c)-f) or an initial search space in a first iteration of c)-f).

11. The method according to claim 7, wherein the probability distribution is based on a set of probabilities that the user equipment is within each one of the plurality of elementary area elements in which the initial search space of the geographic area is subdivided, the set of probabilities comprising a probability in respect of each radio communication station of the at least one radio communication station.

12. The method according to claim 11, wherein each probability ($p(x_{i,j})|_{a\text{-}h}$) of the set of probabilities is computed as:

$$p(x_{i,j})|_{a\text{-}h} = \frac{1}{2\pi\sqrt{\sigma_{i,j}}|_{a\text{-}h}} \times e^{-\frac{(ms|_{a\text{-}h} - es_{i,j}|_{a\text{-}h} - \mu_{ni})^2}{2\sigma_{i,j}|_{a\text{-}h}^2}},$$

wherein, $es_{i,j|a\text{-}h}$ is the expected radio signal strength in the respective one of the elementary area elements ($x_{i,j}$) of the plurality of elementary area elements, $\sigma_{i,j|a\text{-}h}$ is the standard deviation of a statistical error associated with the expected radio signal strength in the respective one of the plurality of elementary area elements ($x_{i,j}$), $ms|_{a\text{-}h}$ is the measured radio signal strength measurement, and $\mu_{ni}$ initial attenuation of the n-th iteration, n is an integer between 1 and N inclusive, and a-h corresponds to each radio communication station a through h.

13. The method according to claim 12, wherein each probability ($p(x_{i,j})|_{a\text{-}h}$) of the set of probabilities is normalized into a corresponding normalized probability ($p_{norm}(x_{i,j})|_{a\text{-}h}$) before being used as a basis for the probability distribution ($d_1(x_{i,j})$, $d_2(x_{i,j})$, $d_n(x_{i,j})$).

14. The method according to claim 13, wherein the probability distribution ($d_1(x_{i,j})$, $d_2(x_{i,j})$, $d_n(x_{i,j})$) is defined by a set of total probabilities ($p(x_{i,j})|_{tot}$) each of which is computed as a product of the normalized probabilities ($p_{norm}(x_{i,j})|_{a\text{-}h}$) associated with a same elementary area element ($x_{i,j}$) of the plurality of elementary area elements.

15. The method according to claim 8, further comprising:

h) computing average expected radio signal strengths as an average of the expected radio signal strengths of each elementary area element comprised in the uncertainty area, and wherein f) comprises computing the final attenuation as an average of the differences between the average expected radio signal strengths and the measured radio signal strengths.

16. A wireless communication network comprising a plurality of radio communication stations transmitting radio signals over a geographic area adapted to implement the method according to claim 1.

17. The wireless communication network according to claim 16, wherein the wireless communication network is a mobile telephony network.

18. The wireless communication network according to claim 16, wherein the wireless communication network is a Global Navigation Satellite System network.

* * * * *